United States Patent

[11] 3,587,773

| [72] | Inventors | Jean Henri Bertin<br>Neuilly-sur-Seine;<br>Paul Francois Guienne, Paris, France |
|---|---|---|
| [21] | Appl. No. | 775,697 |
| [22] | Filed | Nov. 14, 1968 |
| [45] | Patented | June 28, 1971 |
| [73] | Assignee | Bertin & Cie<br>Paris, France |
| [32] | Priority | Nov. 17, 1967 |
| [33] | | France |
| [31] | | 128,758 |

[54] FACILITIES FOR CONFINING THE FLUID CUSHIONS OF A GROUND-EFFECT MACHINE
1 Claim, 4 Drawing Figs.

[52] U.S. Cl. .................................................. 180/124, 180/127

[51] Int. Cl. .................................................. B60v 1/16
[50] Field of Search ........................................ 180/121, 124, 127

[56] References Cited
UNITED STATES PATENTS

| 3,332,508 | 7/1967 | Bertin et al. ................. | 180/121 |
| 3,444,952 | 5/1969 | Clarke ........................... | 180/127 |

*Primary Examiner*—A. Harry Levy
*Attorney*—Stevens, Davis, Miller and Mosher

ABSTRACT: A ground effect vehicle comprises a cushion of plenum-chamber type, and a deformable enclosure is disposed inside the cushion. The enclosure is supplied with pressure fluid so that random variations in cushion pressure are absorbed by deformation of the deformable enclosure.

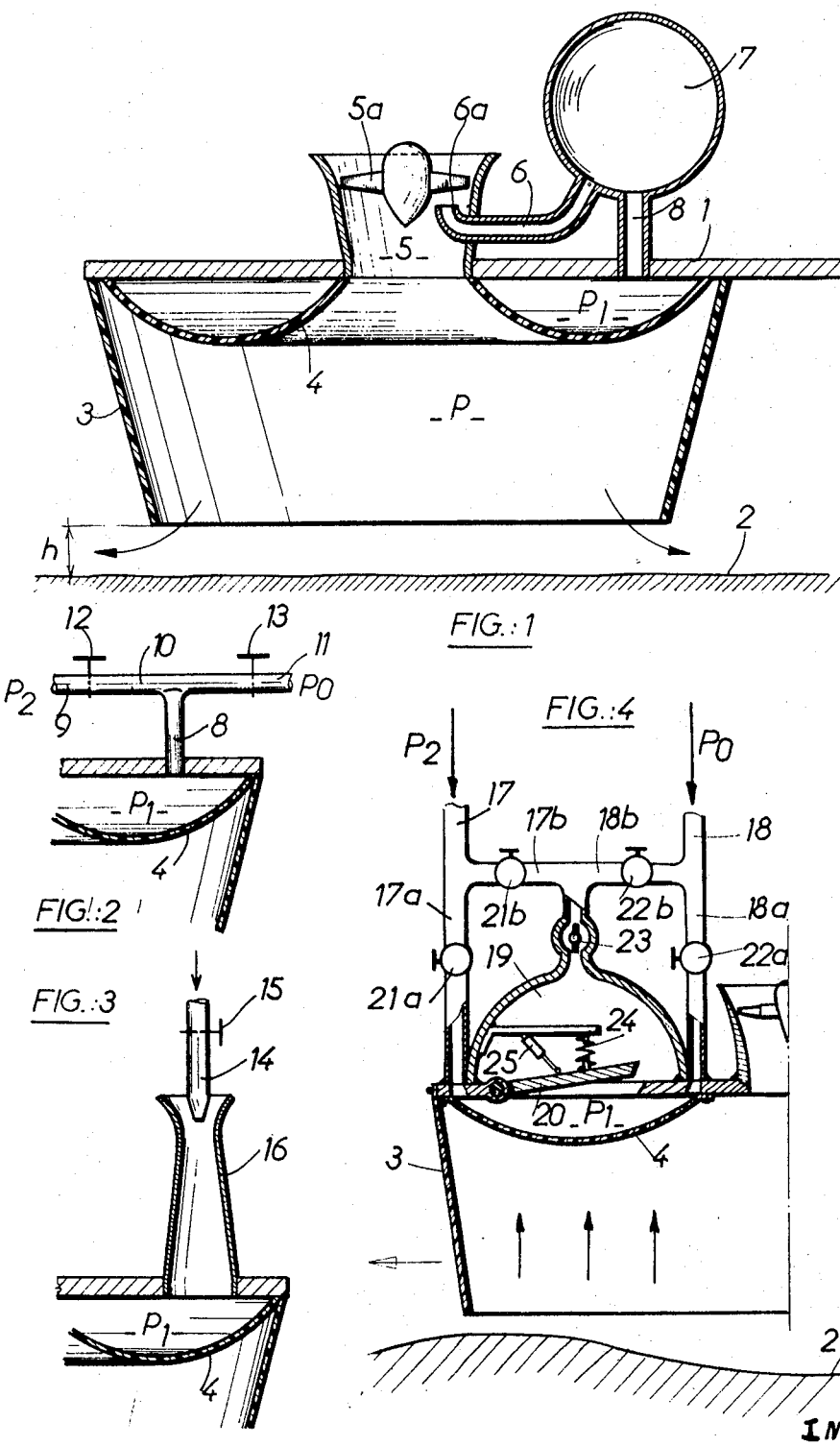

FACILITIES FOR CONFINING THE FLUID CUSHIONS OF A GROUND-EFFECT MACHINE

Cushions of air or other pressure fluid for bearing or guiding a load or a land or water craft by ground effect operate, of course, by the pressure of air or some other fluid maintained between the ground and the load, the volume in which the pressure is operative being bounded laterally by a usually flexible or deformable skirt or by a fluid curtain. Of course the word "ground" denote terrestrial land in general, the surface of a prepared tack or which the load or vehicle is required to move, and a flat stretch of water.

The pressure-fluid source must maintain the cushion at a pressure which balances load or vehicle weight, plus a leakage delivery through the ground and the skirt edge or as a result of air being vehicled away from the cushion with the fluid curtain. If the leakage diminishes as a result of unevennesses in the ground or of load or vehicle movements, cushion pressure increases and the load rises. Conversely, if leakage increases pressure drops and the load descends. The system is therefore stable. However, cushion pressure may become excessive and produce bearing forces, and therefore accelerations, which are unsatisfactory for the equipment and for the passengers on board. More particularly, when leakage varies very rapidly, pressure peaks may be produced with a value in excess of the maximum pressure which the pressure-fluid source can provide. The phenomenon is comparable to water-hammer.

The improvement according to this invention has as its aim to reduce these pressure peaks.

According to this improvement, the solid wall forming at least some of the air-cushion boundary has a deformable portion returned resiliently by a force opposing the force received by such portion from the cushion pressure, the deformable portion having a large enough surface and amplitude of movement for the increase in volume of the air cushion arising from deformation of the deformable portion to be able to absorb brief pressure peaks.

Advantageously, the return force of the deformable portion varies little with the deformation; this can be achieved by producing this return force by a substantially constant fluid pressure slightly above normal cushion pressure.

Preferably, the deformable portion is a bead of rubber or some other flexible resilient substance disposed inside the fluid cushion and inflated like a pneumatic tire to a pressure slightly above the normal cushion pressure, the capacity bounded by this surface comprising a member via which, if the pressure in the cushion becomes excessive, fluid can escape from such capacity.

The following description, taken together with the accompanying exemplary nonlimitative drawings, will show clearly how the invention can be carried into effect, features disclosed by the drawings and text forming of course part of the invention.

In the drawings:

FIG. 1 is a view in elevation and vertical section of an embodiment of an improved fluid cushion according to the invention, and FIGS. 2—4 are partial sections of three variants.

Referring to the drawings, consideration has been given to the case in which the fluid cushion is of the "plenum chamber" kind –i.e., is bounded laterally by a solid and usually flexible wall or skirt, although the invention also covers the case in which the cushion is confined by a pressure-fluid curtain produced by a slitlike nozzle.

In the embodiment shown in FIG. 1, there can be seen a platform 1 of a ground effect vehicle or load support borne by one or more cushions of air or other pressure fluid, only one of the cushions being shown in FIG. 1. As a rule, a cushion of this kind is confined at the top by the wall 1, at the bottom by surface 2 along which the machine moves, and laterally by a flexible skirt 3 (or, as already mentioned, by a fluid curtain).

Pressure-fluid source supplies the cushion through a nozzle 5. In the example shown, the pressure-fluid source is assumed to be a fan whose rotor 5a is shown diagrammatically. The pressure produced in the cushion produces on surface 1 a lifting force tending to raise the vehicle, with a simultaneous increase in the gap and in the leakage flow between the ground and the bottom edge of skirt 3. Equilibrium is reached at a cushion pressure $p$ corresponding to a particular leakage gap $h$. If, due to unevennesses of the ground or irregular vehicle movements, the gap $h$ diminishes briefly, cushion pressure increases, the vehicle rising until the original gap $h$ has been restored. Conversely, when the gap $h$ increases, pressure drops and the vehicle descends until the proper gap and pressure are restored. The system is therefore stable.

However, a vary rapid reduction of the leakage gap may produce brief very high pressure peaks which may possibly exceed the pressure produced by the source, in the event, the compressor delivery pressure.

To reduce these pressure peaks, in the embodiments described the bearing surface for the fluid cushion comprises a deformable hermetic portion 4, e.g. of rubber, which forms in the cushion chamber a kind of annular bead extending around the feed nozzle 5. The bead interior, which forms an enclosure separate from the cushion chamber, is kept inflated to a pressure $p_1$ slightly higher than the normal cushion pressure $p$.

To this end, the embodiment in FIG. 1 comprises a duct 6 which extends into the delivery of the fan 5 by way of an orifice 6a oriented to receive the total fan delivery pressure. Duct 6 extends to the deformable portion or envelope 4 by way of a large chamber 7 and a duct 8, the ducts 6, 8 being open without constrictions. Clearly, therefore, the pressure in chamber 7 and in envelope 4 is higher than the normal cushion pressure $p$, since the pressure $p$ is, due to leakage through the gap $h$, below the total fan delivery pressure. The casing 4 therefore takes up a pressure somewhere between the pressures $p$ and $p_1$, as well as transmitting to the vehicle the lift produced by the pressure $p$.

If the cushion pressure rises abruptly, the flexible envelope 4 tends to flatten out until reaching a new equilibrium position, with a consequent increase in the volume presented to the fluid in the cushion and a correlative decrease of the pressure peak. The effect is the more enhanced, the greater is the possible volume variation of the load formed by the envelope 4. Conveniently, therefore, the envelope 4 has a large surface and is so devised that the volume which it bounds in its equilibrium position corresponding to normal cushion pressure is large.

The required result could be achieved by permanently inflating the envelope 4 to the pressure $p_1$ slightly higher than the pressure $p$ and by hermetically closing the capacity bounded by the envelope 4, as is done in the case of a motor vehicle tire, or else the envelope, instead of being filled with a pressure fluid, could contain one or more springs or even be filled with foam rubber or a synthetic foam material. The advantage of the embodiment described is that, since the ducts 6, 8 are always open, the pressure in the envelope 4 remains substantially constant or varies little, whatever deformations the envelope 4 may experience, and this facilitates absorption of abrupt increases in cushion pressure.

In the variant shown in FIG. 2, the envelope 4 is inflated by a source (not shown) delivering a pressure $p_2$ higher than the pressure $p_1$ normally needed in the envelope 4. The pressure fluid source delivers its pressure at a place 9 to a duct 10 connected to the duct 8 going to the envelope 4 and at a place 11 to atmosphere or any other place at a pressure $p_0$ less than $p_1 \cdot p_1$ can be adjusted to any value between $p_2$ and $p_0$ by means of cocks 12, 13 disposed in duct 10 on either side of duct 8.

In the two embodiments so far described, the duct 8 communicating with the envelope 4 can be devised to provide for a pressure loss of appropriate value with the aim of damping oscillations of the envelope 4.

In the variant shown in FIG. 3, the envelope 4 is supplied by an aspirator comprising a primary fluid injection nozzle 14, control cock 15 and a convergent-divergent portion 16. Nozzle 14 delivers into portion 16 the induced fluid, which can be atmospheric air, as shown. Of course, the aspirator device delivers into the envelope 4 only until the same has been inflated to its equilibrium shape, whereafter the aspirator operates with zero secondary delivery. In this case, of course, the aspirator maintains in the envelope 4 a constant pressure whose value depends upon the primary fluid pressure supplying the nozzle 14 and upon the ratio of the cross section of the throat of the portion 16 to the cross section of the primary nozzle 14.

In the variant shown in FIG. 4, two pressure fluid sources (not shown) supply the deformable envelope 4 through ducts 17, 17a, and 18, 18a respectively and, through ducts 17, 17b and 18, 18b respectively, a capacity 19 disposed on platform 1 opposite a valve 20 adapted to connect envelope 4 to capacity 19. The first source delivers a pressure $p_2$ greater than the pressure $p_1$ normally required in envelope 4, and the second source delivers a pressure $p_0$ which is less than $p_1$ and which can be atmospheric pressure. The various ducts have valves 21a, 21b, 22a, 22b, 23 for adjusting the pressures $p_1$, $p'_1$ in the capacities 4, 19 to values between $p_2$ and $p_0$.

The top surface of valve 20 is biased by a spring 24, which may or may not be associated with a damper 25, and the pressure $p'_1$ in the capacity 19, so that a return force greater than the force applied to the valve bottom surface by the pressure $p_1$ in the envelope 4 is produced. The valve 20 opens in the event of an abrupt increase in the pressure $p_1$ so that the envelope 4 can be formed to take up the pressure peak.

Of course, many modifications can be made to the embodiments described, inter alia by the substitution of equivalent technical means, without for that reason departing from the scope of the invention. Also, some parts of the facilities can be common to a number of cushions. This in the case inter alia with the fan 5 in FIG. 1, the duct 6 and the chamber 7. A number of ducts 8 can be connected to the chamber 7 to supply the envelopes 4 of a number of cushions of a single vehicle. Similarly, in the case shown in FIG. 2, a number of ducts 8 can be connected to the duct 10 between the cocks 12 and 13. In the case shown in FIG. 3, the convergent-divergent part 16 of a single aspirator can deliver into a duct extending to the envelopes 4 of a number of cushions.

We claim:

1. A ground effect vehicle adapted to move opposite a surface and comprising walls providing some of the boundary of a plenum-chamber-type enclosure in which a pressure fluid cushion is produced, the vehicle also comprising a deformable enclosure disposed inside the fluid cushion, the vehicle comprising means for supplying the latter enclosure at a pressure higher than the rated cushion pressure so that random variations in cushion pressure are absorbed by deformation of the deformable enclosure inside the cushion, the vehicle also comprising a fan for supplying the cushion, wherein the enclosure is supplied from a total pressure takeoff connected to the fan delivery, and wherein the enclosure is connected to the total pressure takeoff by way of a buffer capacity.